(12) United States Patent
Chen

(10) Patent No.: US 12,317,861 B2
(45) Date of Patent: Jun. 3, 2025

(54) PET CHEW TOY

(71) Applicant: MEFUN TECHNOLOGY (GD) CO., LTD., JiangMen (CN)

(72) Inventor: Zhanfeng Chen, JiangMen (CN)

(73) Assignee: MEFUN TECHNOLOGY (GD) CO., LTD., JiangMen (CN)

( * ) Notice: Subject to any disclaimer, the term of this patent is extended or adjusted under 35 U.S.C. 154(b) by 107 days.

(21) Appl. No.: 18/091,429

(22) Filed: Dec. 30, 2022

(65) Prior Publication Data

US 2024/0130330 A1   Apr. 25, 2024
US 2024/0224940 A9   Jul. 11, 2024

(30) Foreign Application Priority Data

Oct. 24, 2022   (CN) .......................... 202222804659.5

(51) Int. Cl.
  *A01K 15/02*   (2006.01)

(52) U.S. Cl.
  CPC ................... *A01K 15/026* (2013.01)

(58) Field of Classification Search
  CPC ..... A01K 15/02; A01K 15/025; A01K 15/026
  See application file for complete search history.

(56) References Cited

U.S. PATENT DOCUMENTS

| | | | | |
|---|---|---|---|---|
| 8,899,187 | B2 * | 12/2014 | Axelrod | A01K 29/00 |
| 10,531,641 | B2 * | 1/2020 | Valle | A01K 15/02 |
| 11,477,965 | B2 * | 10/2022 | Kendall | A01K 15/02 |
| 2016/0106068 | A1 * | 4/2016 | Axelrod | A01K 11/00 |
| 2017/0020109 | A1 * | 1/2017 | Dewey | A01K 11/00 |

* cited by examiner

*Primary Examiner* — Joshua J Michener
*Assistant Examiner* — Henry Hooper Mudd
(74) *Attorney, Agent, or Firm* — Birchwood IP

(57) ABSTRACT

A pet chew toy includes a first member and a second member. The first member and the second member are circumferentially rotatably connected to switch and keep the pet chew toy in different shapes. The first member and the second member are axially limited. Two adjacent members of the pet chew toy are rotatable relative to one another to change the shape of the pet chew toy. Therefore, a pet keeper can rotate the two adjacent members according to actual needs to keep the pet chew toy in different shapes, such that a pet can chew the pet chew toy from multiple angles and different parts. In addition, since the first member and the second member are axially limited, the two adjacent members do not easily separate from each other when the pet chew toy is chewed by the pet.

12 Claims, 5 Drawing Sheets

PET CHEW TOY

CROSS REFERENCE TO THE RELATED APPLICATIONS

This application is based upon and claims priority to Chinese Patent Application No. 202222804659.5, filed on Oct. 24, 2022, the entire contents of which are incorporated herein by reference.

TECHNICAL FIELD

The present disclosure relates to the technical field of pet products and, in particular, to a pet chew toy.

BACKGROUND

Pet toys are designed for pets to play and chew. Pet toy is a type of parent-child toy based on pets as a human partnership, which can help humans to interact with pet friends and get emotional comfort from them. At present, pet toys on the market generally include a plurality of members, and pet keepers can change the number of members according to actual needs to keep the pet toy in the desired shape. However, two adjacent members in the pet toys on the market cannot be switched between different angles after being assembled, resulting in a single shape of the pet toy, and they easily separate from each other when being chewed by the pet.

SUMMARY

The present disclosure provides a pet chew toy to solve the problem that two adjacent members of the existing pet toy cannot be switched between different angles after being assembled and easily separate from each other when being chewed by the pet.

To solve the above technical problem, the present disclosure adopts the following technical solutions.

The pet chew toy includes a first member and a second member. The first member and the second member are circumferentially rotatably connected to switch and keep the pet chew toy in different shapes, and the first member and the second member are axially limited.

In an embodiment, one of the first member and the second member is provided with a first mounting portion, and the other of the first member and the second member is provided with a second mounting portion. The first mounting portion includes a first mounting slot and a second mounting slot that are communicated with each other. The radial dimension of the first mounting slot is larger than the radial dimension of the second mounting slot. The second mounting portion includes a limit portion and a support portion. The limit portion is axially limited in the first mounting slot. The support portion penetrates through the second mounting slot. The rotational damping is formed between the first mounting portion and at least one of the limit portion and the support portion.

In an embodiment, the first member or the second member is elastic. The first mounting slot has a first guide surface facing a side where the second mounting slot is located, and the limit portion has a second guide surface facing a side where the support portion is located. At least one of the first guide surface and the second guide surface is an inclined or curved surface. The limit portion is separated from the first mounting portion via the second mounting slot by leaving the first mounting slot along the first guide surface.

In an embodiment, the first member is an integrally molded structure, and the second member is an integrally molded structure formed based on the first member.

In an embodiment, the first member is made of thermoplastic polyurethane rubber (TPU), and the second member is made of polyamide (PA).

In an embodiment, one of the first member and the second member is provided with a first mounting portion, and the other of the first member and the second member is provided with a second mounting portion. The first mounting portion is provided with a pivoting slot and a guide piece protruding from the inner wall of the pivoting slot. The second mounting portion includes a support portion and a limit portion radially protruding from the support portion. The limit portion overcomes an elastic resistance of the first mounting portion or the second mounting portion and moves along the guide piece toward the pivoting slot, such that the guide piece is located on the outer side of the limit portion and limits the axial movement of the limit portion.

In an embodiment, the guide piece has an outwardly inclined surface or a curved surface, and a plurality of guide pieces are circumferentially arranged.

In an embodiment, the first mounting portion is further provided with a damping slot located on the outer side of the guide piece, and the support portion is further provided with a damping piece. The number of at least one of the damping piece and the damping slot is multiple. The damping piece is engaged with the damping slot to increase the circumferentially rotational damping between the first mounting portion and the second mounting portion.

In an embodiment, a plurality of damping slots are provided circumferentially continuously. Each of the damping slots is provided with inclined or curved surfaces on two circumferentially opposite sides. The damping piece is rotatable forward or backward in the damping slot to disengage from one damping slot and enter the next damping slot.

In an embodiment, the inner diameter of a ring structure formed by the plurality of damping slots is not less than the inner diameter of the pivoting slot and the outer diameter of the limit portion.

In an embodiment, each of the first member and the second member is an integrally molded structure made of PA.

In an embodiment, the first member and the second member are configured to circumferentially continuously rotate one full turn, namely 360°.

In an embodiment, at least two second members are rotatably provided on two sides of the first member.

In an embodiment, the pet chew toy is a robot. The first member constitutes a body of the robot, and the second members constitute arms of the robot.

According to the above technical solutions, the embodiments of the present disclosure have at least the following beneficial effects.

In the pet chew toy in the embodiment of the present disclosure, two adjacent members (e.g., the first member and the second member) are rotatable relative to one another to change the shape of the pet chew toy. Therefore, the pet keeper can rotate the two adjacent members according to actual needs to keep the pet chew toy in different shapes, such that the pet can chew the pet chew toy from multiple angles and different parts. In addition, since the first member and the second member are axially limited, the two adjacent members do not easily separate from each other when being chewed by the pet.

BRIEF DESCRIPTION OF THE DRAWINGS

To describe the technical solutions in the embodiments of the present disclosure or the prior art more clearly, the following briefly describes the accompanying drawings required for describing the embodiments or the prior art. It will become apparent that the accompanying drawings in the following description show some embodiments of the present disclosure, and those of ordinary skill in the art may still derive other drawings from these accompanying drawings without creative efforts.

Figure 1:
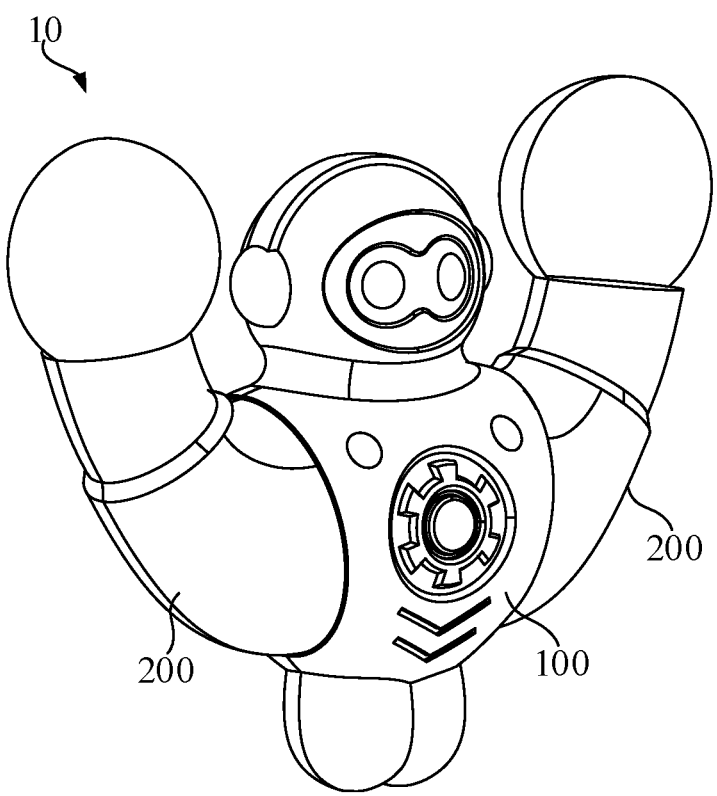
FIG. 1 is a structural view of a pet chew toy kept in a posture according to a first embodiment of the present disclosure.

REFERENCE NUMERALS 10. pet chew toy; 100. first member; and 200. second member; and 300. first mounting portion; 310. first mounting slot; 311. first guide surface; 320. second mounting slot; 330. pivoting slot; 340. guide piece; 350. damping slot; 400. second mounting portion; 410. limit portion; 411. second guide surface; 420. support portion; and 421. damping piece.

DETAILED DESCRIPTION OF THE EMBODIMENTS

The typical implementations embodying the features and advantages of the present disclosure are described in detail below. It should be understood that the present disclosure is susceptible to various changes in different implementations, which do not depart from the scope of the present disclosure. The description and drawings herein are essentially used for explanation, rather than to limit the present disclosure.

Moreover, the terms such as "first" and "second" are used only for description and should not be construed as indicating or implying relative importance or implicitly indicating a quantity of indicated technical features. Therefore, the features defined by "first" and "second" can explicitly or implicitly include one or more features. In the description of the present application, "a plurality of" means two or more unless otherwise specifically defined.

It should be noted that, unless otherwise clearly specified, in the description of the present disclosure, meanings of the terms "mount", "provide", and "connect" should be understood in a broad sense. For example, a connection may be a fixed connection, a removable connection, or an integral connection; it may be a mechanical connection or an electrical connection; it may be a direct connection or an indirect connection via an intermediate medium; or it may be intercommunication between two components. Those of ordinary skill in the art may attribute specific meanings to the above terms in the present disclosure based on specific situations.

Figure 2:
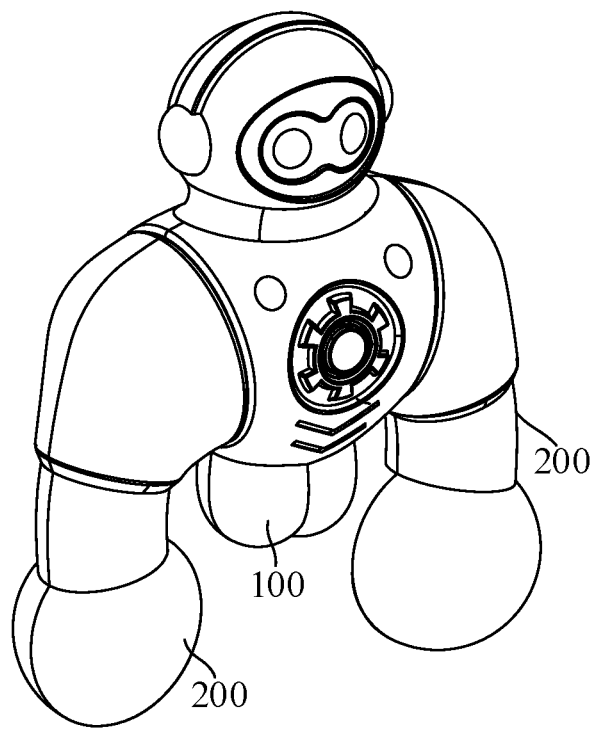
FIG. 2 is a structural view of the pet chew toy kept in another posture according to the first embodiment of the present disclosure.

Referring to FIGS. 1 and 2, the present disclosure provides pet chew toy 10. The pet chew toy 10 is designed for pet cats and dogs to play and chew to promote emotional interactions between pets and keepers. The pet chew toy 10 can be kept in different shapes, such that the pet can chew from multiple angles and different parts of the pet chew toy 10.

The pet chew toy 10 includes first member 100 and second member 200. The first member 100 and the second member 200 are circumferentially rotatably connected. The first member 100 and the second member 200 are rotatable relative to each other to switch the pet chew toy 10 to different shapes and postures and keep it in different shapes and postures. The relative rotation angle between the first member 100 and the second member 200 is not limited herein. For example, the first member 100 may continuously rotate one full turn clockwise or counterclockwise relative to the second member 200.

As shown in FIGS. 1 and 2, there are two second members 200. The two second members 200 are rotatably provided on two sides of the first member 100. In an embodiment, the pet chew toy 10 is a robot, which can be of any type. For example, in this embodiment, the robot can be provided as an astronaut. In this case, the first member 100 can be understood as the body part of the robot, and the first member 100 can at least include the head and body of the robot, and the head can have eyes. The second members 200 can be understood as the arms of the robot. That is, the two second members 200 together constitute the left arm and the right arm of the robot. Referring to FIGS. 1 and 2, FIG. 1 shows that the two arms of the pet robot are in a raised state, and FIG. 2 shows that the two arms of the pet robot are in a suspended state. The two arms can also be rotated to any angle. It should be understood that in other embodiments, one or more second members 200 can also be provided. In addition, the pet chew toy 10 is not limited to the pet robot but can also include any two members.

The first member 100 and the second member 200 are axially limited, which does not necessarily mean that the first member 100 and the second member 200 are completely stuck. In the protection scope of the present disclosure, at least one of the first member 100 and the second member 200 can be elastically deformed. Therefore, when the first member 100 and the second member 200 tend to be relatively far away, the first member 100 and the second member 200 can overcome the elastic force under the action of an external force to do work to achieve the separation purpose.

In the pet chew toy 10 in the embodiment of the present disclosure, two adjacent members (e.g., the first member 100 and the second member 200) are rotatable relative to one another to change the shape of the pet chew toy. Therefore, the pet keeper can rotate the two adjacent members according to actual needs to keep the pet chew toy 10 in different shapes, such that the pet can chew the pet chew toy from multiple angles and different parts. In addition, since the first member 100 and the second member 200 are axially limited, the two adjacent members do not easily separate from each other when being chewed by the pet, which ensures the durability of the pet chew toy 10.

Figure 3:
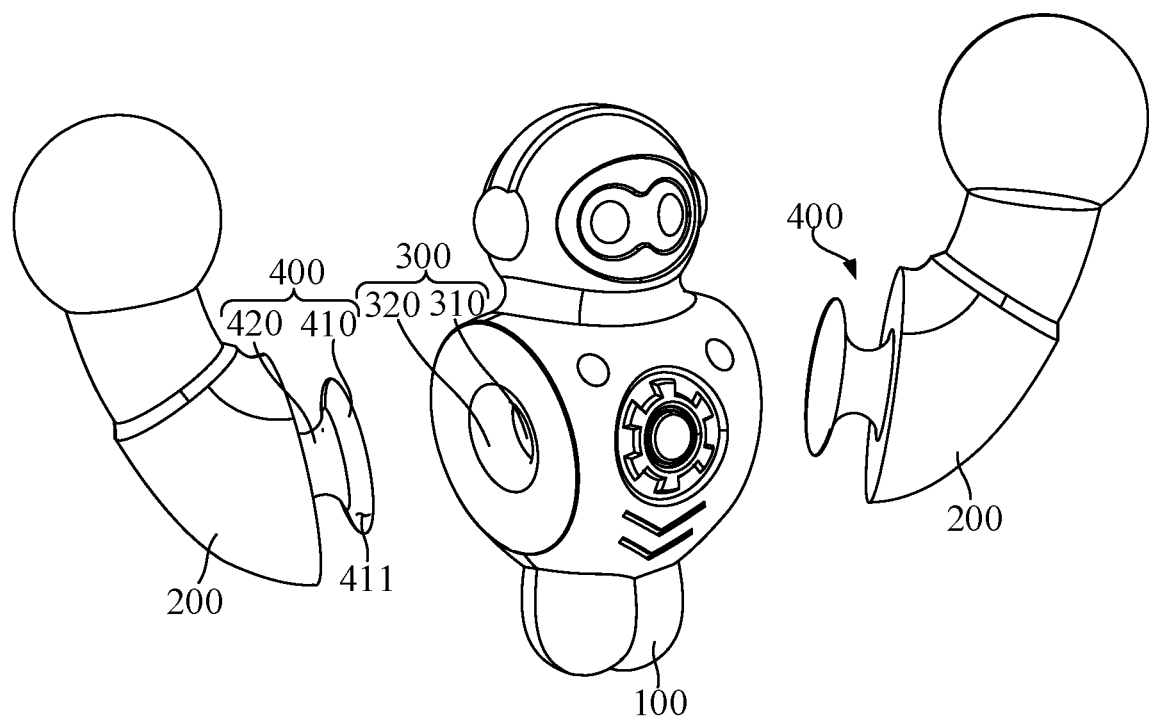
FIG. 3 is an exploded view of the pet chew toy shown in FIG. 1.
Figure 4:
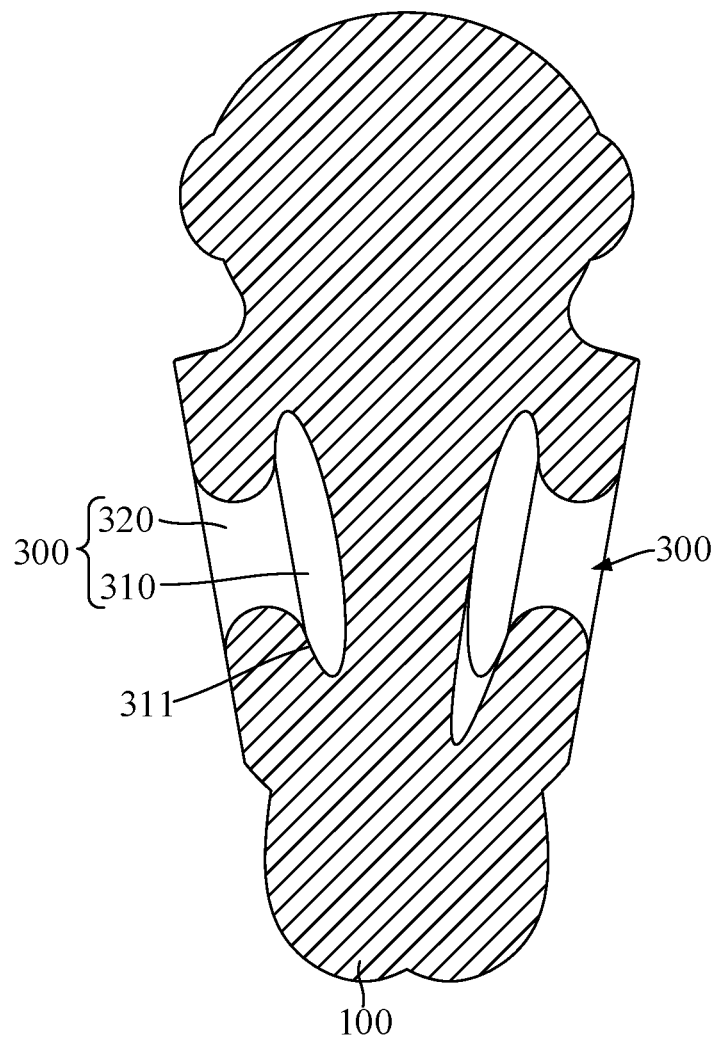
FIG. 4 is a structural view of the first member of the pet chew toy shown in FIG. 3.

Referring to FIGS. 3 and 4, one of the first member 100 and the second member 200 is provided with first mounting portion 300, and the other of the first member 100 and the second member 200 is provided with second mounting portion 400. As shown in FIG. 3, the first mounting portion 300 is provided in the first member 100, and the second mounting portion 400 is provided in the second member 200. The first mounting portion 300 includes first mounting slot 310 and second mounting slot 320 that are communicated with each other. The radial dimension of the first mounting slot 310 is larger than the radial dimension of the second mounting slot 320. Alternatively, the width of the first mounting slot 310 is larger than the width of the second mounting slot 320. Alternatively, the second mounting slot 320 is provided at the bottom of the first mounting slot 310. The second mounting portion 400 includes limit portion 410 and support portion 420. The radial dimension of the limit portion 410 is larger than the radial dimension of the second mounting slot 320, such that the limit portion 410 is axially limited in the first mounting slot 310 without separation. The support portion 420 penetrates through the second mounting slot 320. At least one of the limit portion 410 and the support portion 420 has rotational damping with the first mounting portion 300, such that the second mounting portion 400 is fixed at an arbitrary angle through the damping when it rotates circumferentially relative to the first mounting portion 300.

In an embodiment, the first member 100 or the second member 200 is made of an elastic material and thus is elastic. The first mounting slot 310 has first guide surface 311 facing a side where the second mounting slot 320 is located, and the limit portion 410 has second guide surface 411 facing a side where the support portion 420 is located. At least one of the first guide surface 311 and the second guide surface 411 is an inclined or curved surface. The limit portion 410 can be separated from the first mounting portion 300 via the second mounting slot 320 by leaving the first mounting slot 310 along the first guide surface 311. When the limit portion 410 is separated from the first mounting portion 300, the elastic one of the first member 100 and the second member 200 is elastically deformed. For example, if the first member 100 is elastic, the second mounting slot 320 is extended by the limit portion 410, and the width of the second mounting slot 320 is equal to the outer diameter of the limit portion 410.

The first member 100 and the second member 200 can be separated from each other by overcoming the elastic force. In some use scenarios, different styles of member combinations can be used according to actual needs. It should be understood that in other embodiments, the first member 100 and the second member 200 cannot be separated from each other elastically.

In an embodiment, the first member 100 is an integrally molded structure, and the second member 200 is an integrally molded structure formed based on the first member 100. For example, after the first member 100 is integrally molded, another material is molded into the first member 100 to form the second member 200. In this way, the tedious procedure of separately forming the first member 100 and the second member 200 and assembling the first member 100 and the second member 200 is omitted. The secondary molding method can further improve the bonding strength of the first member 100 and the second member 200 to avoid the separation of the first member and the second member under force. It should be noted that the secondary molding method has requirements for the materials of the first member 100 and the second member 200, that is, the first member 100 and the second member 200 should be made of different materials. For example, the first member 100 is made of thermoplastic polyurethane rubber (TPU), and the second member 200 is made of polyamide (PA).

Second Embodiment

Figure 5:
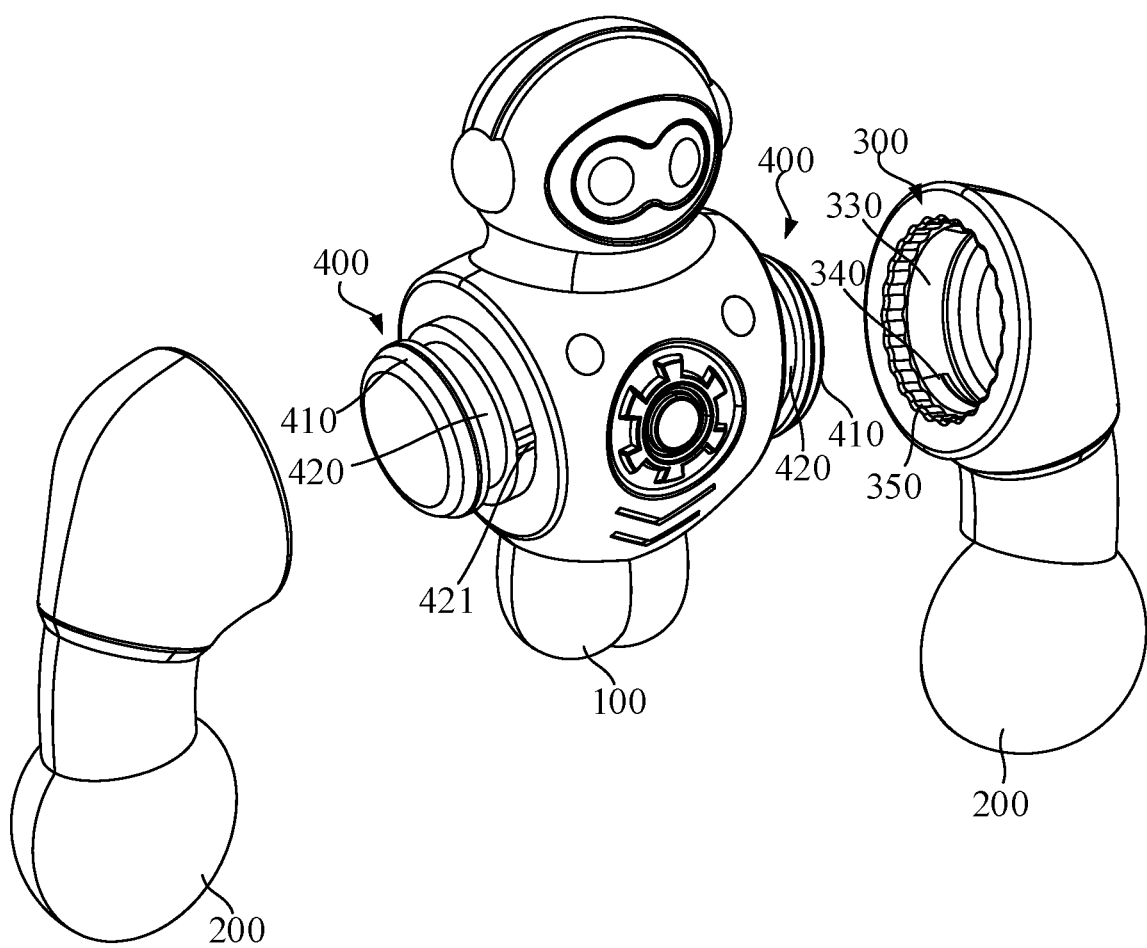
FIG. 5 is an exploded view of the pet chew toy kept in the posture shown in FIG. 2 according to the second embodiment of the present disclosure.
Figure 6:
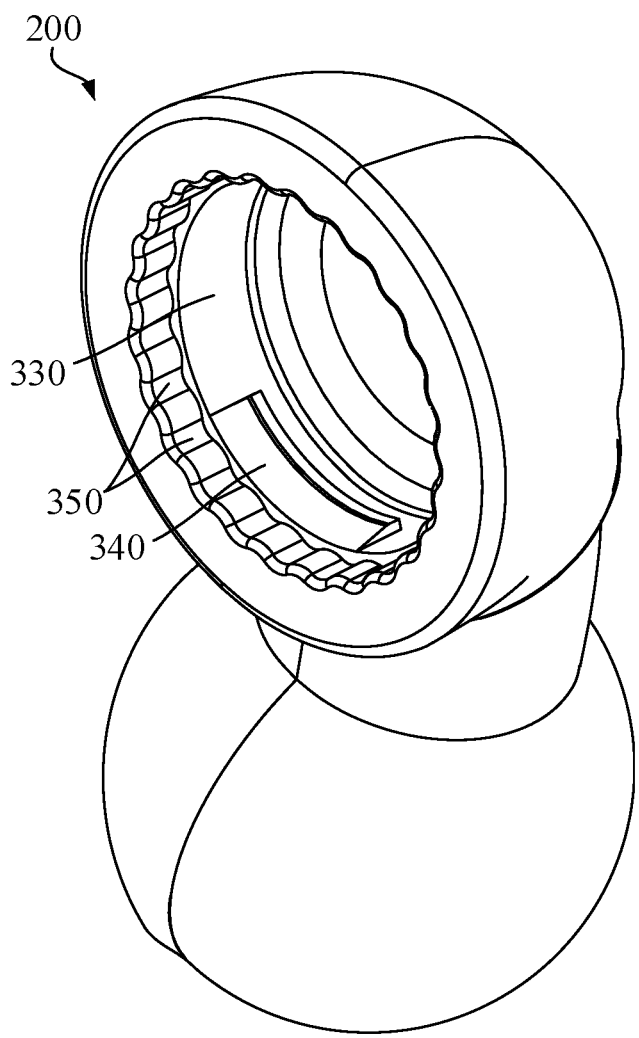
FIG. 6 is a structural view of a second member of the pet chew toy shown in FIG. 5.

Referring to FIGS. 5 and 6, FIG. 5 shows an exploded view of a second embodiment of the pet chew toy 10, and FIG. 6 is a structural view of the second member 200 in the second embodiment of the pet chew toy 10.

The structure of the pet chew toy 10 in this embodiment is similar to the first embodiment, but the difference is that the matching structure of the first mounting portion 300 and the second mounting portion 400 is different. In this embodiment, the first mounting portion 300 is provided with pivoting slot 330 and guide piece 340 protruding from the inner wall of the pivoting slot 330. The guide piece 340 has an outwardly inclined surface or a curved surface. A plurality of guide pieces 340 are circumferentially arranged. Of course, there may also be one guide piece 340, or the guide piece 340 is circumferentially continuous. The second mounting portion 400 includes support portion 420 and limit portion 410 radially protruding from the support portion 420. The first mounting portion 300 or the second mounting portion 400 is elastic. The limit portion 410 overcomes the elastic resistance of the first mounting portion 300 or the second mounting portion 400 and moves along the guide piece 340 toward the pivoting slot 330, such that the guide piece 340 is located on the outer side of the limit portion 410 and limits the axial movement of the limit portion 410. When the limit portion 410 is limited by the guide piece 340, the limit portion 410 is circumferentially rotatable relative to the guide piece 340.

In an embodiment, the first mounting portion 300 is further provided with damping slot 350 located on the outer side of the guide piece 340, and the support portion 420 is further provided with damping piece 421. The number of at least one of the damping piece 421 and the damping slot 350 is multiple. The damping piece 421 is engaged with the damping slot 350 to increase the circumferentially rotational damping between the first mounting portion 300 and the second mounting portion 400. The damping piece 421 is matched with the damping slot 350, such that the first member 100 and the second member 200 can be adjusted and maintained at a certain relative angle. In addition, when the rotational damping is formed between the first member 100 and the second member 200, for example, the limit portion 410 is abutted against a wall of the pivoting slot 330, the matching of the damping piece 421 with the damping slot 350 can improve the damping.

It should be noted that in an embodiment, there may be a plurality of damping slots 350. The plurality of damping slots 350 are provided circumferentially continuously. Each of the damping slots 350 is provided with inclined or curved surfaces on two circumferentially opposite sides. The damping piece 421 is rotatable forward or backward in the damping slot 350 to disengage from one damping slot 350 and enter the next damping slot 350. It can be understood that in other embodiments, each of the damping slots 350 may further be provided with an inclined or curved surface on the same side of the circumferential arrangement direction of the plurality of damping slots 350 and may be provided with a radial vertical surface on the other opposite side. In this case, the damping piece 421 can only rotate in one direction and cannot rotate in the opposite direction in the damping slot 350. It should be noted that the inner diameter of the ring structure formed by the plurality of damping slots 350 is not less than the inner diameter of the pivoting slot 330 and the outer diameter of the limit portion 410 to ensure that the limit portion 410 smoothly enters the pivoting slot 330.

In this embodiment, the fabrication of the first member 100 and the second member 200 does not need the secondary molding method, so the materials of the first member 100 and the second member 200 can be the same, for example, PA.

The present disclosure is described above by referring to several typical implementations. It should be understood that the terms used herein are intended for illustration, rather than as limitations. The present disclosure may be specifically implemented in many forms without departing from the spirit or essence of the present disclosure. Therefore, it should be understood that the above embodiments are not limited to any of the above-mentioned details but should be broadly interpreted according to the spirit and scope defined by the appended claims. Therefore, any changes and modifications falling within the claims or the equivalent scope thereof should be covered by the appended claims.

What is claimed is:

1. A pet chew toy, comprising a first member and a second member, wherein the first member and the second member are circumferentially rotatably connected to switch and keep the pet chew toy in different shapes; and the first member and the second member are axially limited, wherein one of the first member and the second member is provided with a first mounting portion, and the other of the first member and the second member is provided with a second mounting portion; and the first mounting portion is provided with a pivoting slot and a guide piece protruding from an inner wall of the pivoting slot; the second mounting portion comprises a support portion and a limit portion radially protruding from the support portion; and the limit portion overcomes an elastic resistance of the first mounting portion or the second mounting portion and moves along the guide piece toward the pivoting slot, such that the guide piece is located on an outer side of the limit portion and limits an axial movement of the limit portion.

2. The pet chew toy according to claim 1, wherein one of the first member and the second member is provided with a first mounting portion, and the other of the first member and the second member is provided with a second mounting portion; the first mounting portion comprises a first mounting slot and a second mounting slot, wherein the first mounting slot and the second mounting slot are communicated with each other; a radial dimension of the first mounting slot is larger than a radial dimension of the second mounting slot; the second mounting portion comprises a limit portion and a support portion; the limit portion is axially limited in the first mounting slot; the support portion penetrates through the second mounting slot; and a rotational damping is formed between the first mounting portion and at least one of the limit portion and the support portion.

3. The pet chew toy according to claim 2, wherein the first member is an integrally molded structure, and the second member is an integrally molded structure formed based on the first member.

4. The pet chew toy according to claim 3, wherein the first member is made of thermoplastic polyurethane rubber (TPU), and the second member is made of polyamide (PA).

5. The pet chew toy according to claim 1, wherein the guide piece has an outwardly inclined surface or a curved surface, and a plurality of guide pieces are circumferentially arranged.

6. The pet chew toy according to claim 1, wherein the first mounting portion is further provided with a damping slot located on an outer side of the guide piece, and the support portion is further provided with a damping piece; a number of at least one of the damping piece and the damping slot is multiple; and the damping piece is engaged with the damping slot to increase a circumferentially rotational damping between the first mounting portion and the second mounting portion.

7. The pet chew toy according to claim 6, wherein a plurality of damping slots are provided circumferentially continuously; each of the plurality of damping slots is provided with inclined or curved surfaces on two circumferentially opposite sides; and the damping piece is rotatable forward or backward in the damping slot to disengage from one damping slot and enter a next damping slot.

8. The pet chew toy according to claim 7, wherein an inner diameter of a ring structure formed by the plurality of damping slots is larger than or equal to an inner diameter of the pivoting slot and an outer diameter of the limit portion.

9. The pet chew toy according to claim 1, wherein each of the first member and the second member is an integrally molded structure made of PA.

10. The pet chew toy according to claim 1, wherein the first member and the second member are configured to circumferentially continuously rotate one full turn, wherein the one full turn is 360°.

11. The pet chew toy according to claim 1, wherein at least two second members are rotatably provided on two sides of the first member.

12. The pet chew toy according to claim 11, wherein the pet chew toy has a body, a head, and arms, wherein the first member constitutes the body, and the at least two second members constitute the arms.

* * * * *